US008917440B2

(12) United States Patent
Kim et al.

(10) Patent No.: US 8,917,440 B2
(45) Date of Patent: Dec. 23, 2014

(54) ACTIVE OPTICAL DEVICE USING PHASE CHANGE MATERIAL

(75) Inventors: Sun-il Kim, Seoul (KR); Jun-hee Choi, Seongnam-si (KR); Jong-min Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 13/091,360

(22) Filed: Apr. 21, 2011

(65) Prior Publication Data

US 2012/0127562 A1   May 24, 2012

(30) Foreign Application Priority Data

Nov. 19, 2010  (KR) .................. 10-2010-0115764

(51) Int. Cl.
*G02B 26/06* (2006.01)
*G02F 1/29* (2006.01)
*G02F 1/01* (2006.01)

(52) U.S. Cl.
CPC .......... *G02F 1/0147* (2013.01); *G02F 2202/32* (2013.01); *G02F 2201/305* (2013.01); *G02F 1/292* (2013.01)
USPC .......................................... 359/298; 359/820

(58) Field of Classification Search
CPC . G02F 1/0147; G02F 1/292; G02F 2201/305; G02F 2202/32
USPC .......................... 359/290–298, 820
See application file for complete search history.

(56) References Cited

U.S. PATENT DOCUMENTS

| | | | | |
|---|---|---|---|---|
| 4,872,743 | A * | 10/1989 | Baba et al. | 359/298 |
| 7,369,327 | B1 * | 5/2008 | Nishioka | 359/726 |
| 7,507,293 | B2 * | 3/2009 | Li et al. | 117/86 |
| 2004/0155154 | A1 * | 8/2004 | Topping | 244/158 R |
| 2006/0131501 | A1 | 6/2006 | Ikushima et al. | |

FOREIGN PATENT DOCUMENTS

| | | |
|---|---|---|
| KR | 10-2001-0045476 A | 6/2001 |
| KR | 10-0308638 A | 8/2001 |
| KR | 10-0916929 B1 | 9/2009 |
| KR | 10-2011-0131801 A | 12/2011 |
| KR | 10-2011-0132135 A | 12/2011 |
| KR | 1020110131801 A | 12/2011 |
| KR | 1020110132135 A | 12/2011 |

OTHER PUBLICATIONS

Aurelian Crunteanu et al, Vis-IR Optical Switching/Modulation Based on the Electrically-Activated Phase Transition of VO₂ Thin Films, OSA/CLEO/QELS 2010.

(Continued)

*Primary Examiner* — Thomas K Pham
*Assistant Examiner* — Vipin Patel
(74) *Attorney, Agent, or Firm* — Sughrue Mion, PLLC

(57) ABSTRACT

An active optical device is provided. The active optical device includes an optically variable layer having a refractive index which changes according to temperature; and a temperature control unit that controls a temperature of one or more regions of the optically variable layer.

11 Claims, 4 Drawing Sheets

(56) References Cited

OTHER PUBLICATIONS

Ren, Dawai, et al. "Anisotropic Mg Incorporation in GaN growth on nonplanar templates," Applied Physics Letters, American Institute of Physics, 86, 121901 (2005), pp. 1-3.

Wunderer, Thomas, et al. "Bright semipolar GaInN/GaN blue light emitting diode on side facets of selectively grown GaN stripes," Applied Physics Letters, American Institute of Physics, 89, 041121 (2006), pp. 1-3.

Neubert, B., et al. "Semipolar GaN/GaInN LEDs with more than 1 mW optical output power," Journal of Crystal Growth, vol. 298; , pp. 706-709, Dec. 26, 2006.

Neubert, et al.; "Semipolar GaN/GaInN LEDs with more than 1 mW optical output power" Journal of Crystal Growth, Dec. 2006, vol. 298, pp. 706-709.

Wunderer, et al.; "Bright semipolar GaInN/GaN blue light emitting diode on side facets of selectively grown GaN stripes", American Institute of Physics, 2006, vol. 89, pp. 041121-1 to 041121-3.

Ren, et al.; "Anisotropic Mg incorporation in GaN growth on nonplanar templates", American Institute of Physics, 2005, vol. 86, pp. 121901-1 to 121901-3.

* cited by examiner

ACTIVE OPTICAL DEVICE USING PHASE CHANGE MATERIAL

CROSS-REFERENCE TO RELATED APPLICATION

This application claims priority from Korean Patent Application No. 10-2010-0115764, filed on Nov. 19, 2010, in the Korean Intellectual Property Office, the disclosure of which is incorporated herein in its entirety by reference.

BACKGROUND

1. Field

The present disclosure relates to active optical devices using a phase change material.

2. Description of the Related Art

Optical devices, such as a lens, a mirror, or a prism, are variously used for modulating the path of light in an optical system. In general, optical devices are formed of materials having fixed refractive indexes, and the effect the device has on the path of light is based, in large part, on the shape of the device. Accordingly, in order to control the path of light in an optical system in a desired way, complicated structures are often needed.

Such complexity may be addressed by using a spatial light modulator (SLM) capable of performing functions of multiple optical devices. The key function of an SLM is that its refractive index can be controlled according to an external signal. A conventional SLM includes liquid crystal material to achieve such a function. In such SLMs, however, the speed at which the refractive index can be changed may be too slow for many functions, and there is a limitation in the size of the SLM.

SUMMARY

One or more embodiments provide active optical devices for quickly modulating a refractive index according to an external signal.

According to an aspect of an embodiment, there is provided an active optical device including: an optically variable layer comprising a material having a refractive index which changes according to a temperature of the optically variable layer; and a temperature control unit for locally controlling the temperature of one or more regions of the optically variable layer.

The optically variable layer may include a vanadium dioxide ($VO_2$) film.

The temperature control unit may include a micro heating array that dissipates heat in a periodic and alternating pattern causing a refractive index of regions of the optically variable layer to change.

The micro heating array may include a plurality of heating regions that are heated according to an electrical control thereof, and the heating regions may be periodically aligned.

The micro heating array may also include a plurality of supporting regions which connect the heating regions in series, where a width of each of the supporting regions is smaller than a width of each of the heating regions.

The optically variable layer may include a photonic crystal layer having a photonic bandgap.

The photonic crystal layer may include a layer of $VO_2$ and a plurality of spherical cells that are three-dimensionally and periodically aligned within the $VO_2$. The photonic crystal layer may have a plurality of regions, where in each region, spherical cells are periodically aligned. The sizes and alignment periods of the spherical cells may be different in different of the regions, such that different of the regions have different photonic bandgaps.

The spherical cells may be filled with a material having a refractive index that is fixed and different from a refractive index of the $VO_2$ layer. The photonic crystal layer may include a plurality of regions, where different of the regions have spherical cells with different refractive indexes, such that different of the regions have different photonic bandgaps.

The photonic crystal layer may include a substrate and a plurality of spherical particles that are formed of $VO_2$ and are three-dimensionally aligned on the substrate. The photonic crystal layer may include a plurality of regions, where different of the regions include spherical cells having different sizes and/or different alignment periods, such that different of the regions have different photonic bandgaps.

The temperature control unit may include a micro heating array that dissipates heat to change the refractive index of the $VO_2$ of the photonic crystal layer, thereby changing the photonic bandgap of the photonic crystal layer.

BRIEF DESCRIPTION OF THE DRAWINGS

The above and/or other aspects will become apparent and more readily appreciated from the following description of embodiments, taken in conjunction with the accompanying drawings in which:

FIGS. 1A and 1B are schematic views of an active optical device according to an embodiment, in which FIG. 1A shows an off-driving state of the active optical device and FIG. 1B shows an on-driving state of the active optical device;

FIGS. 3A and 3B are schematic views of an active optical device according to another embodiment, in which FIG. 3A shows an off-driving state of the active optical device and FIG. 3B shows an on-driving state of the active optical device; and FIGS. 4A and 4B are schematic views of an active optical device according to another embodiment, in which FIG. 4A shows an off-driving state of the active optical device and FIG. 4B shows an on-driving state of the active optical device.

DETAILED DESCRIPTION

Figure 1A:
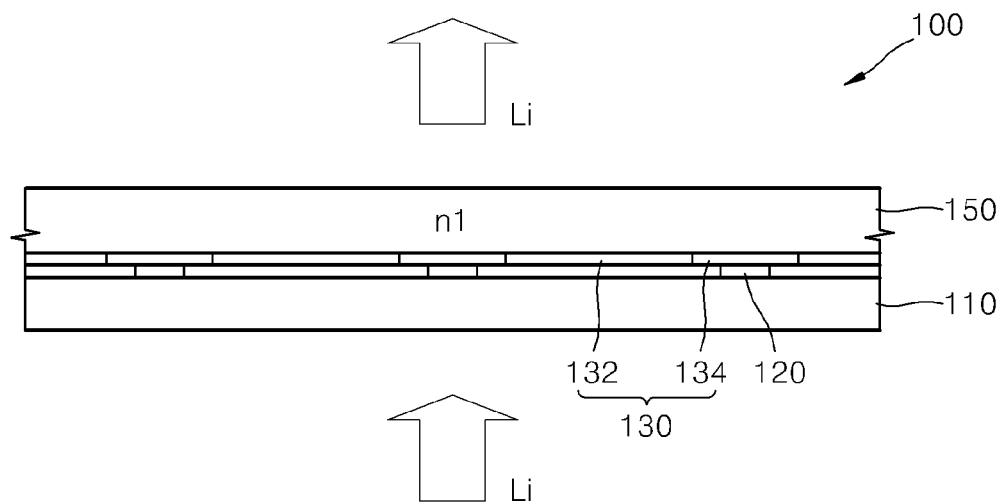

Reference will now be made in detail to embodiments, examples of which are illustrated in the accompanying drawings, wherein like reference numerals refer to like elements throughout, and sizes of elements in the drawings may be exaggerated for clarity and ease of description. In this regard, the present embodiments may have different forms and should not be construed as being limited to the descriptions set forth herein. Accordingly, the embodiments are merely described below, by referring to the figures, to explain exemplary aspects of the present description.

In the following embodiments, a phase change material having a phase which varies according to temperature is used. That is, an active optical device is based on the concept that the permittivity of a material varies according to the phase of the material which itself varies according to an external temperature. The refractive index of the material thereby changes with a change in the permittivity of the material.

An example of a phase change material is vanadium dioxide ($VO_2$), which undergoes a radical phase change at a threshold temperature of about 67° C. (340 K). When the phase change occurs at the threshold temperature, a monoclinic structure that has a semiconducting property due to its crystal structure in a cold phase, is converted into a tetragonal structure having a metallic property in a hot phase. Accordingly, a relative permittivity of the material changes from about 8.4 to about 5.3, respectively corresponding to a refractive index change from a refractive index of about 2.9 to a refractive index of about 2.3. The refractive index of a medium is one factor that directly affects the path of light passing through the medium. Also, it is reported that the transition of the refractive index due to the phase change occurs within less than about 500 fs. The phase change material described above may be used in an active optical device capable of variously and quickly modulating properties of incident light.

Figure 1B:
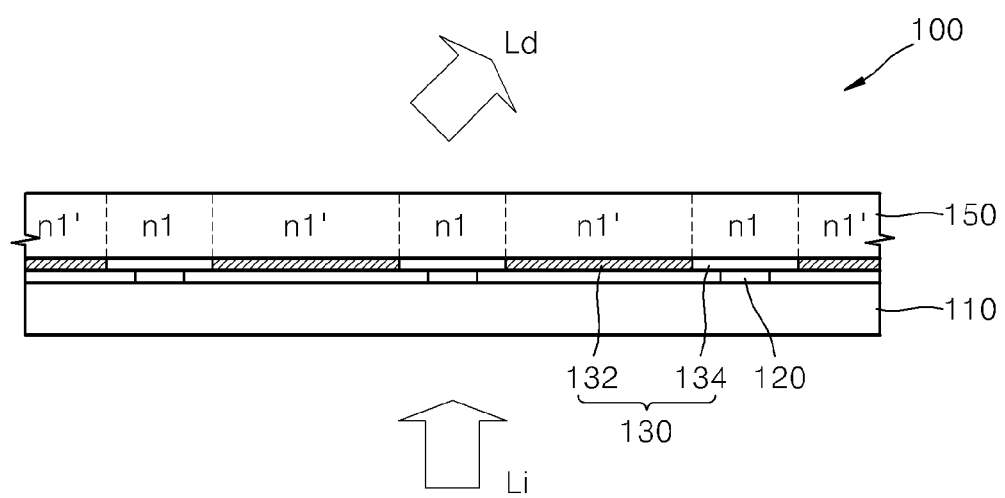

FIGS. 1A and 1B are schematic views of an active optical device 100 according to an embodiment, in which FIG. 1A shows an off-driving state of the active optical device 100 and FIG. 1B shows an on-driving state of the active optical device 100. The active optical device 100 of the present embodiment functions as a variable grating.

Referring to FIGS. 1A and 1B, the active optical device 100 includes an optically variable layer 150 including a material whose refractive index varies according to temperature, and a temperature control unit for locally controlling the temperature of the optically variable layer 150.

The optically variable layer 150 may include a vanadium dioxide $VO_2$ film.

The temperature control unit may include a micro heating array 130 for dissipating heat to form a refractive index alternating pattern in the optically variable layer 150. The micro heating array 130 have a plurality of heating regions 132 that are heated by electrical control, and the heating regions 132 are periodically aligned.

Figure 2:
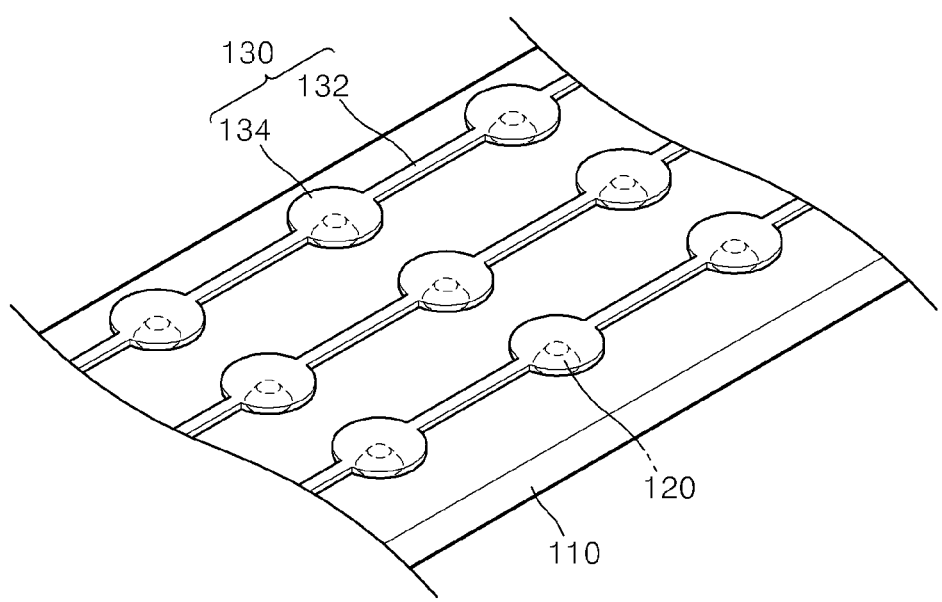
FIG. 2 is a partial perspective view of a temperature control unit included in the optical device of FIGS. 1A and 1B.

FIG. 2 is a partial perspective view of the temperature control unit included in the optical device 100 of FIGS. 1A and 1B.

The micro heating array 130 may be formed on a substrate 110, and the micro heating array 130 includes supporting regions 134 and heating regions 132 having a width that is smaller than the supporting regions 134. As illustrated in FIG. 2, the micro heating array 130 includes the heating regions 132 and the supporting regions 134 which are alternately aligned in series. The micro heating array 130 may include a metallic material, for example, molybdenum or tungsten.

The heating region 132 having a smaller width than the supporting region 134 enables the micro heating array 130 to selectively deliver heat to regions of the optically variable layer 150. When power is applied to the micro heating array 130, the micro heating array 130 are heated by joule heating. In this regard, since a width of the heating region 132 is smaller than a width of the supporting region 134, the heating region 132 dissipates more heat than the supporting region 134. The width of the heating region 132 is determined such that the temperature of the regions of the optically variable layer 150 increased by heating is higher than a threshold temperature at which phase change occurs. Also, the width of the supporting region 134 is determined such that the temperature of the regions of the optically variable layer 150 that are increased by heating is lower than a threshold temperature at which phase change occurs. Supporting portions 120 are disposed under the supporting regions 134 and between the supporting regions 134 and the substrate 110 to support the micro heating array 130.

However, the structure of the temperature control unit is not limited thereto, and the temperature control unit may have any one of various structures in which the temperature of a predetermined region or regions of the optically variable layer 150 is selectively changed. For example, the temperature control unit may include a temperature control array capable of independently controlling one or more predetermined regions of the optically variable layer 150.

Referring back to FIG. 1A, in the off-driving state, no current is applied to the micro heating array 130 and the active optical device 100 is turned off. In this case, the optically variable layer 150 does not undergo a phase change and has a refractive index of n1 at room temperature throughout the optically variable layer 150. An incident light Li passes through the active optical device 100 without any modulation.

Referring to FIG. 1B, in the on-driving state, a current is applied to the micro heating array 130 and the alternately aligned heating regions 132 are heated by joule heating and thus corresponding regions of the optically variable layer 150 undergo a phase change. The regions of the optically variable layer 150 that undergo a phase change have a refractive index that changes from n1 to n1'. Accordingly, the resultant optically variable layer 150 in the on-driving state has alternating regions of refractive index n1 and refractive index n1', and the optically variable layer functions as a phase grating and thus, the incident light Li entering the active optical device 100 is modulated into diffracted light Ld. The alternation period of n1 and n1' and the sizes of the regions having the refractive indexes of n1 and n1' may correspond to the repetition period of the heating region 132 and the supporting region 134 of the micro heating array 130 and to the sizes of the heating region 132 and the supporting region 134, and the alternation period and the sizes of the regions may be appropriately determined according to desired diffraction efficiency.

Figure 3A:
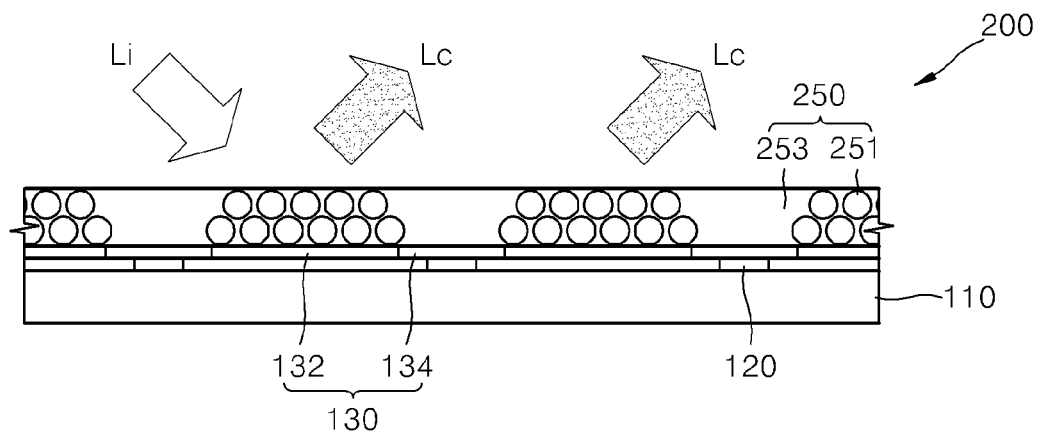
Figure 3B:
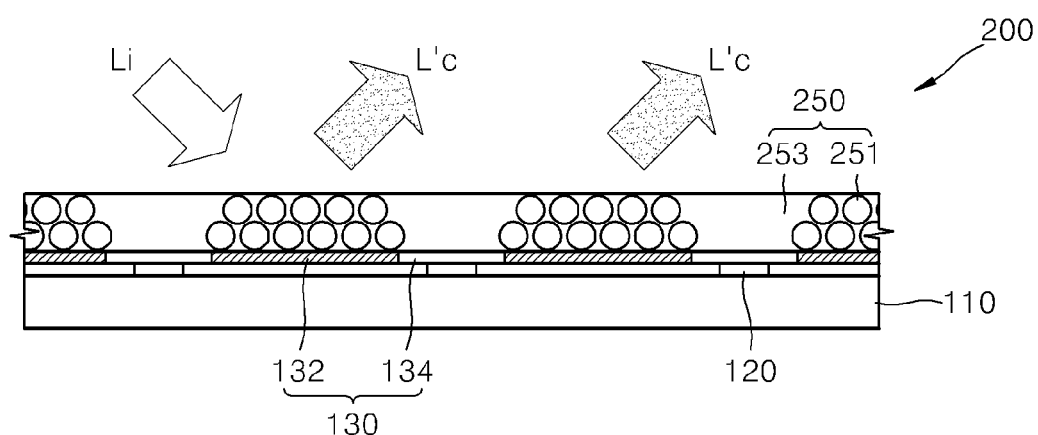

FIGS. 3A and 3B are schematic views of an active optical device 200 according to another embodiment, in which FIG. 3A shows an off-driving state of the active optical device 200 and FIG. 3B shows an on-driving state of the active optical device 200. The active optical device 200 according to the present embodiment may be used as a tunable color filter.

The active optical device 200 includes an optically variable layer 250 including a material having a refractive index that varies according to temperature and a temperature control unit for controlling the temperature of the optically variable layer 250. The temperature control unit may include a micro heating array 130 for selectively delivering heat to a predetermined region or regions of the optically variable layer 250. The micro heating array 130 may include heating regions 132 heated by electrical control. The heating regions 132 may be periodically aligned.

In the present embodiment, the optically variable layer 250 may include a photonic crystal having a predetermined photonic bandgap. For example, as illustrated in FIGS. 3A and 3B, the optically variable layer 250 may include a $VO_2$ material layer 253 having a plurality of spherical cells 251 disposed therein, where the spherical cells are periodically aligned in three dimensions. The spherical cells 251 may be empty cells filled with air, or cells filled with a material having a fixed, constant refractive index which is different from the refractive index of the VO2 material layer 253. A photonic crystal such as this one having a lattice structure in which two or more materials having different refractive indexes are regularly and two- or three-dimensionally aligned has a particular wavelength band within which incident light cannot pass in any direction due to the periodic refractive index distribution, and the particular wavelength band is referred to as a photonic bandgap.

Referring to FIG. 3A, in the off-driving state, no current is applied to the micro heating array 130 and the active optical device 200 is turned off. In this case, the $VO_2$ material layer 253 of the optically variable layer 250 does not undergo a phase change, and the $VO_2$ material layer 253 has a refractive index of n1 at room temperature. The inside of the spherical cells 251 has a refractive index of n2, different from n1. Of the incident light Li, light Lc is reflected by the active optical device 200. The light Lc corresponds to the photonic bandgap formed by the photonic crystal having the three-dimensional lattice structure of refractive indexes of n1 and n2 in the optically variable layer 250.

Referring to FIG. 3B, in the on-driving state, a current is applied to the micro heating array 130 and the alternately aligned heating regions 132 are heated by joule heating and thus corresponding regions of the optically variable layer 250 undergo a phase change. The region or regions that undergo the phase change have a refractive index that changes from n1 to n1'. Thus, light Lc' is reflected by the active optical device 200. The light Lc' corresponds to the photonic bandgap formed by the photonic crystal having a three-dimensional lattice structure of refractive indexes of n1' and n2 in the optically variable layer 250. In this case, the wavelength band of the photonic bandgap of the device 200 in the off-driving state (shown in FIG. 3A) is different from the wavelength band of the photonic bandgap of the device 200 in the on-driving state (shown in FIG. 3B). That is, by turning on or off the micro heating array 130, the wavelength band of the reflected light may be controlled.

Although the photonic crystal illustrated in FIGS. 3A and 3B has periodically aligned regions having the same photonic bandgap, this structure is just an example. For example, different photonic bandgaps according to red (R), green (G), and blue (B) pixels may be manufactured and then the reflection wavelength band may be controlled by turning on or off the micro heating array 130. In this case, to have different photonic bandgaps, an photonic crystal layer of the optically variable layer 250 may have a plurality of periodically aligned regions in which the spherical cells 251 have different sizes and different alignment periods. Alternatively, while sizes and alignment periods of the spherical cells 251 may be constant, a plurality of regions having spherical cells 251 filled with materials having different refractive indexes may be periodically aligned.

Figure 4A:
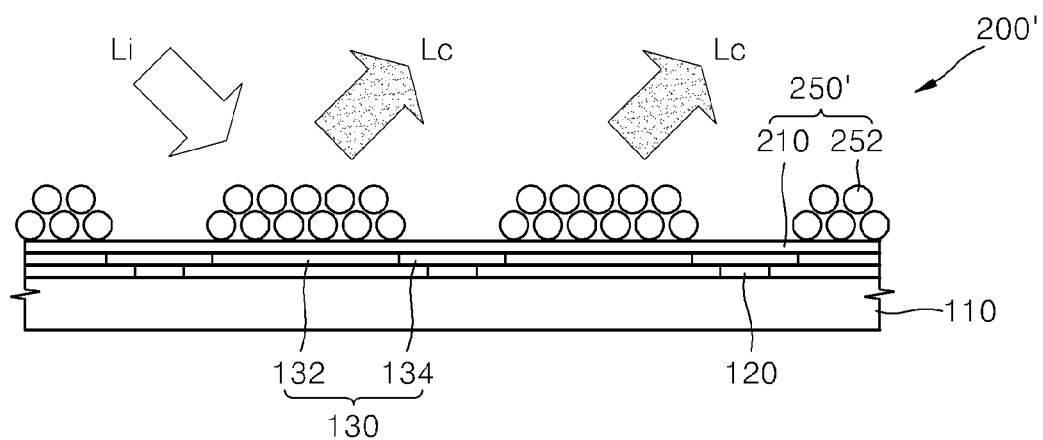
Figure 4B:
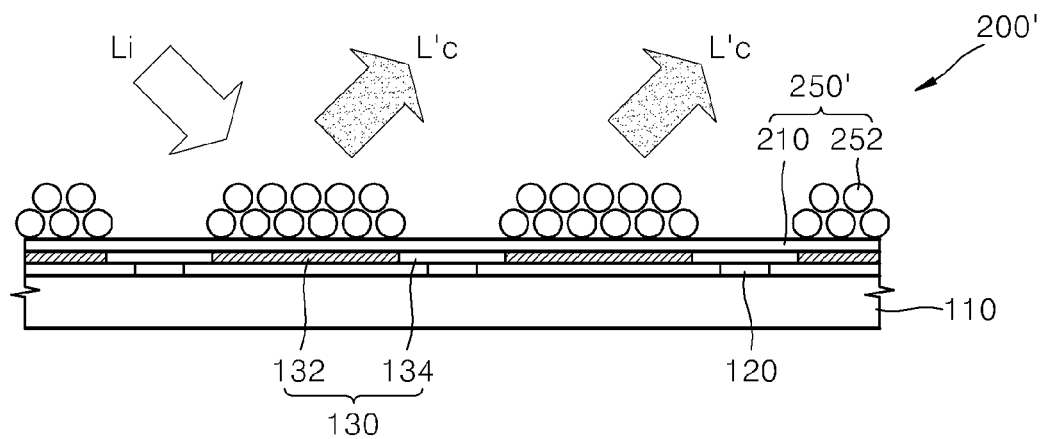

FIGS. 4A and 4B are schematic views of an active optical device 200' according to another embodiment, in which FIG. 4A shows an off-driving state of the active optical device 200' and FIG. 4B shows an on-driving state of the active optical device 200'. Like the active optical device 200, the active optical device 200' according to the present embodiment may also function as a tunable color filter. The active optical device 200' is a modified example of the active optical device 200 of FIGS. 3A and 3B. The active optical device 200' of FIGS. 4A and 4B is different from the active optical device 200 of FIGS. 3A and 3B with respect to the photonic crystal layer of the optically variable layer 250'. The optically variable layer 250' includes spherical particles 252 including a VO$_2$ material three-dimensionally aligned on the substrate 210. The spherical particles 252 including the VO$_2$ material have a refractive index of n1 and the surrounding medium has a refractive index of n2, and the spherical particles are three-dimensionally aligned to form a photonic crystal. The photonic crystal of the current embodiment has an inversed structure as compared to the photonic crystal of FIGS. 3A and 3B, and the structure of the photonic crystal may be selected to have the structure of FIGS. 3A and 3B, or the structure of FIGS. 4A and 4B, in view of processing and manufacturing considerations when the photonic crystal is manufactured using VO$_2$ material.

In the present embodiment, in the photonic crystal layer 250', spherical particles 252 having the same sizes and the same alignment periods are periodically aligned. However, this structure is just an example. For example, in the photonic crystal layer 250', spherical particles 252 having different sizes and/or different alignment periods may be periodically aligned so as to provide different photonic bandgaps.

Referring to FIG. 4A, when the micro heating array 130 is turned off, the active optical device 200' reflects light Lc that corresponds corresponding to the photonic bandgap formed by the optically variable layer 250'. Referring to FIG. 4B, when the micro heating array 130 is turned on, the refractive index of the spherical particles 252 is changed from n1 to n1'. Thus, light Lc' corresponding to a photonic bandgap that is different from that illustrated in FIG. 4A is reflected.

The active optical devices may quickly and variously modulate properties of incident light by using a material that undergoes a phase change at a predetermined temperature.

An active optical device using a material which has a phase that changes according to temperature, as has been described above with reference to the active optical devices 100, 200, and 200'. However, besides diffraction modulation and wavelength modulation, the structure of an active optical device may be configured to modulate other properties, such as the path or polarization of light and thus, active optical devices according to the present description may be used as any of various variable optical devices. In addition, active optical devices according to the present description may be used in an optical recording/reproducing system or a display device, which are optical systems in which switching of an optical modulation function is needed.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An active optical device comprising:
   an optically variable layer having a refractive index which changes according to application of temperature above a threshold temperature; and
   a temperature control unit that controls a temperature of one or more regions of the optically variable layer, wherein the temperature control unit comprises a micro heating array,
   wherein the micro heating array comprises:
   a plurality of heating regions that are heated according to an electrical control thereof, and the heating regions are periodically aligned, and
   a plurality of supporting regions that electrically connect the heating regions in series, wherein a width of each of the heating regions is smaller than a width of each of the supporting regions, such that, due to the width of each of the heating regions application of a current to the micro heating array causes a temperature each of the heating regions to increase to a temperature above the threshold temperature and causes a temperature of each of the supporting regions to increase to a temperature lower than the threshold temperature.

2. The active optical device of claim 1, wherein the optically variable layer comprises a film of VO$_2$.

3. The active optical device of claim 2, wherein the micro heating array dissipates heat in a periodic and alternating pattern causing a refractive index of regions of the optically variable layer to change forming a periodic and alternating refractive index pattern in the optically variable layer.

4. The active optical device of claim 1,
   wherein the optically variable layer comprises a photonic crystal layer having a photonic bandgap.

5. The active optical device of claim 4, wherein the photonic crystal layer comprises a layer of $VO_2$ and a plurality of spherical cells that are three-dimensionally and periodically aligned within the layer of $VO_2$.

6. The active optical device of claim 5, wherein the photonic crystal layer further comprises a plurality of regions, wherein, in each region, spherical cells are periodically aligned, and wherein sizes and alignment periods of the spherical cells are different in different regions, such that different regions have different photonic bandgaps.

7. The active optical device of claim 5, wherein the spherical cells are filled with a material having a refractive index which is fixed and which is different from a refractive index of the $VO_2$.

8. The active optical device of claim 7, wherein the photonic crystal layer comprises a plurality of regions, wherein spherical cells of different regions are filled with materials having different refractive indexes, such that different regions have different photonic bandgaps.

9. The active optical device of claim 4, wherein the photonic crystal layer comprises a substrate and a plurality of spherical particles comprising $VO_2$, and the spherical particles are three-dimensionally aligned on the substrate.

10. The active optical device of claim 9, wherein the photonic crystal layer further comprises a plurality of regions, wherein the spherical cells of different regions have different sizes and different alignment periods, such that different regions have different photonic bandgaps.

11. The active optical device of claim 4, wherein the photonic crystal layer comprises $VO_2$, and the temperature control unit comprises a micro heating array that dissipates heat to cause a refractive index of the $VO_2$ to change, thereby changing the photonic bandgap of the photonic crystal layer.

* * * * *